Jan. 19, 1954  C. W. MUNDAY  2,666,893
APPARATUS FOR MEASURING THE MAGNETIC SUSCEPTIBILITY OF GASES
Filed Dec. 19, 1950  2 Sheets-Sheet 1
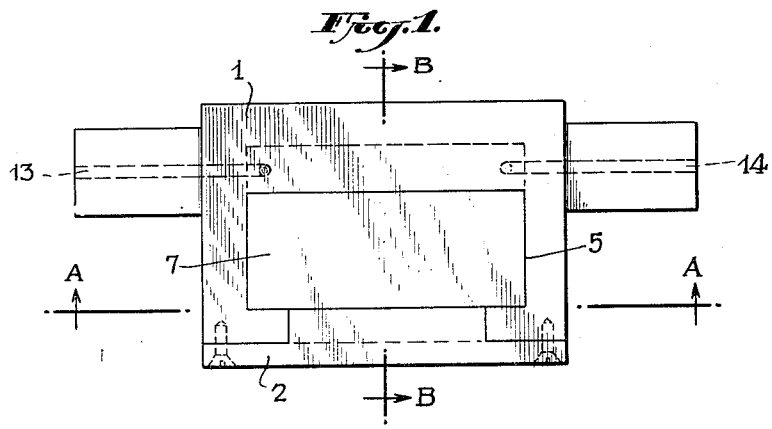
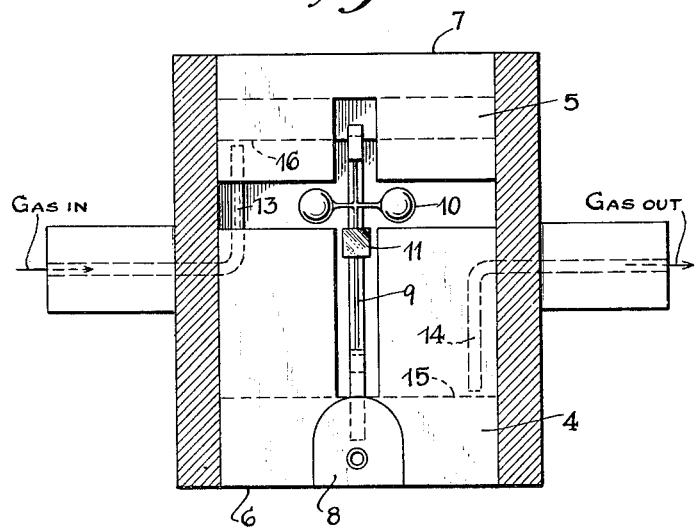 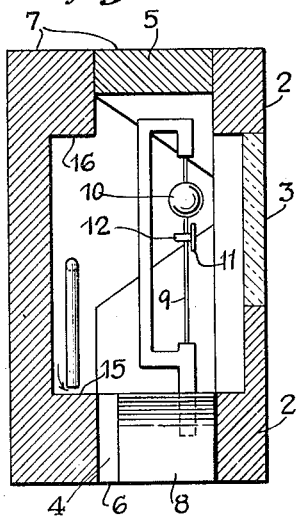
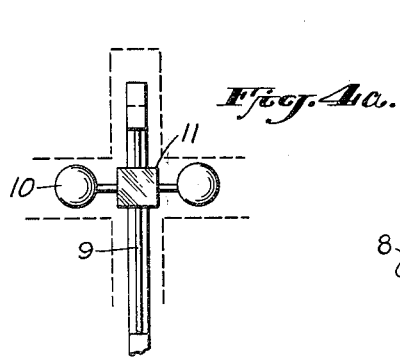 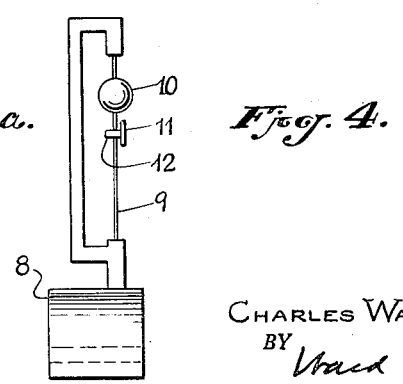
INVENTOR.
CHARLES WALTER MUNDAY.
BY
ATTORNEYS.

Jan. 19, 1954  C. W. MUNDAY  2,666,893
APPARATUS FOR MEASURING THE MAGNETIC SUSCEPTIBILITY OF GASES
Filed Dec. 19, 1950  2 Sheets-Sheet 2
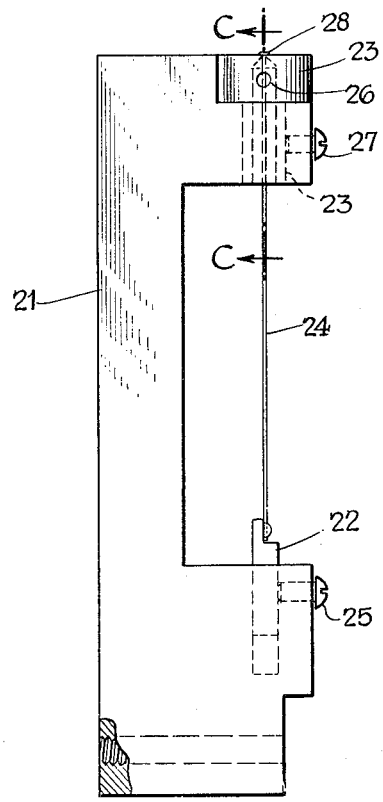
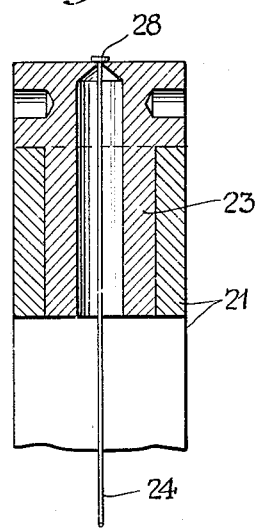
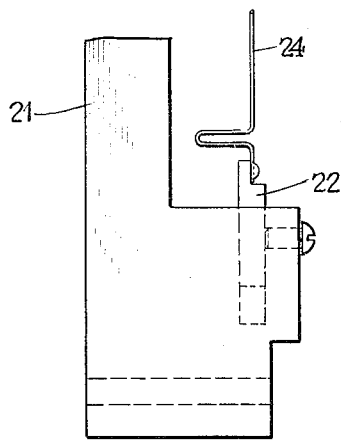
INVENTOR.
CHARLES WALTER MUNDAY.
BY
ATTORNEYS.

Patented Jan. 19, 1954

2,666,893

UNITED STATES PATENT OFFICE 2,666,893

APPARATUS FOR MEASURING THE MAGNETIC SUSCEPTIBILITY OF GASES

Charles Walter Munday, London, England, assignor to The Distillers Company Limited, Edinburgh, Scotland, a British company Application December 19, 1950, Serial No. 201,551

Claims priority, application Great Britain December 22, 1949

11 Claims. (Cl. 324—36)

This invention is for improvements in or relating to apparatus for measuring the magnetic susceptibility of gases, and to determine their chemical components accordingly.

It is known that the magnetic susceptibility of gases can be determined by suspending a solid body in a non-uniform magnetic field surrounded by the gas under test and measuring the force acting on the body, as is described by Faraday, in Royal Institution Proceedings, vol. 1 (1851), page 254.

The property of magnetic susceptibility of gases can be employed to determine the composition of the gases under test. Thus, for example, if a gas is passed continuously or discontinuously around the test piece, variation in the composition of the gas creating a variation in the magnetic susceptibility of the gas will cause a variation in the position taken in the magnetic field by the suspended body and this movement of the solid body can be employed, when suitably calibrated, to determine changes in the composition of the gases being tested.

There has been described in the art an apparatus for determining changes in the composition of gases wherein the gases are passed through an apparatus, placed in a non-uniform magnetic field, wherein said apparatus contains a test piece freely suspended on a quartz fibre, said fibre carrying a mirror. Deflection of the test body, corresponding to changes in the composition of the gas, are observed by means of the mirror and a light spot, as for a mirror galvanometer.

This type of apparatus is not adapted for commercial use in plants for the continuous testing of gases by ordinary plant operatives. The freely suspended test piece is very sensitive to the passage of gases through the apparatus and to mechanical shocks. An important object of the invention is to provide a practical apparatus which may be easily operated by ordinary plant operatives to determine the components of such gases.

The invention accordingly comprises the novel apparatus and combinations thereof, specific embodiments of which are described herein by way of example only and in accordance with the manner in which I now prefer to practice the invention.

The present invention is for an apparatus for measuring the magnetic susceptibility of gases which comprises a magnet and a cell, preferably constrained to slide between the facing poles of said magnet providing a chamber between the facing poles of said magnet made of a substantially non-magnetic material, having a frame and two magnetic pole pieces shaped to produce a non-uniform magnetic field tightly fitting in the ends thereof, a test piece suspended in said chamber between the two pole pieces on a fibre rigidly supported at both ends within the chamber, means for the passage of gas through the chamber, said chamber being otherwise substantially gas tight when in position between the poles of the magnet, and means for the measurement of the angular deflection of the test piece in accordance with the magnetic susceptibility of the gas in said chamber.

The present invention also comprises the cell, which is preferably adapted to slide between the facing poles of a magnet, said cell consisting of a frame, open at both ends to be adjacent to the poles of the magnet, made of a substantially non-magnetic material containing preferably slidably therein, and fitting into the ends of the frame, two pole pieces shaped to produce a non-uniform magnetic field and suspended therebetween a test piece, of the kind described, suspended on a fibre, said fibre being rigidly supported at both ends within the cell, said cell being substantially gas tight when in position between the poles of the magnet and provided with means for the passage of gas therethrough, and means for the measurement of the angular deflection of the test piece, such as a mirror carried by the fibre.

The test piece may comprise a solid or hollow body made of a material of substantially zero magnetic susceptibility, or slight diamagnetic volume susceptibility, for example of the order of $-0.5 \times 10^{-9}$ to $-2.5 \times 10^{-9}$ c. g. s. units, in any suitable shape, such that when said body is suspended in the cell it will respond to variations in the magnetic susceptibility of the gases contained in the cell. Quartz is the preferred constructional material for the test piece, but other materials which may be used include Pyrex glass, soda glass and plastic materials of appropriate magnetic and physical properties. The test piece may be in any suitable shape that will respond to the magnetic forces such as a bar or hollow cylinder or preferably a dumb-bell.

The pole pieces may be made of magnetically soft mild steel of low reluctance or other metal of low magnetic reluctance such as mu metal, stalloy and the like. The cell frame may be made of a substantially non-magnetic material such as copper, brass, dural and the like.

The optimum shape of the pole pieces which will give the desired results, for example, maximum field strength or maximum field gradient consistent with the minimum volume of the cell may be calculated from known principles. The shape of pole pieces which is preferred is shown in the accompanying drawings.

Very suitably the test piece comprises quartz dumb-bells of the type consisting of two blown quartz bulbs with substantially equal dimensions and weight connected by a quartz rod said connecting rod being cemented at the centre, and at right angles to the supporting fibre. Increase in the weight of the quartz dumb-bells is attended by loss of the sensitivity of the instrument and suitably the quartz dumb-bell test piece should not weigh more than about 5 milligrams. The lighter the dumb-bells, the more capable the cell will be to resist any mechanical shocks and the smaller will be the volume magnetic susceptibility of the test piece. The fibre must be capable of carrying the dumb-bells but its dimensions must not of course be such that it is impossible to amplify the deflections of the test piece satisfactorily. The measurement of the angular deflection of the test piece is suitably effected by cementing a mirror on to the test body, the deflections of the test piece and of the fibre being measured by means of a light spot in the usual way. A counterweight may be provided so that the centre of inertia of the test piece substantially coincides with the axis of the torsion fibre.

However the cementing of such a counterweight to the test piece presents considerable practical difficulties, and it is a further object of the present invention to provide a test piece of the type described supported on a fibre of the kind described, wherein the necessity of having to employ a counterweight is avoided. This can suitably be effected by cementing the dumb-bell type test piece at its centre to the suspending fibre and at right angles thereto, the bar between the bulbs of the test piece being so curved that the centre of inertia of the test piece coincides with the axis of the torsion fibre.

When employing a mirror in conjunction with the test piece, the mirror may be cemented to the bar joining the bulbs of the test piece in a position substantially at the centre of gravity thereof, and the curvature of said bar being such that the centre of inertia of the test piece and mirror unit coincides with the axis of the torsion fibre.

The degree of curvature of the bar connecting the bulbs of the test piece can be calculated from known principles.

Thus, for example, with a test piece carrying a mirror, the degree of curvature of the bar joining the bulbs of the test piece required such that the centre of inertia of the test piece coincides with the axis of the torsion fibre, is that said bar is bent into the segment of an anchor ring of mean radius $R$, where $R$ is given approximately by the formula $$R = \frac{b^2 c + 6e(b+d)^2}{6h(a+g) + 6a(h+c+2e)}$$

where the dumb-bell consists of a cylindrical rod, of radius "$a$," length "$2b$" and mass "$c$" at each end of which is a hollow sphere of radius "$d$" and mass "$e$," and the mirror attached to the centre of the rod being square of side "$2f$," thickness $2g$, and mass $h$.

Thus, for example, where $a = 0.125$ mm.
$b = 1.5$ mm.
$c = 1.0$ mgm.
$d = 1.35$ mm.
$e = 2.25$ mgm.
$f = 1.0$ mm.
$g = 0.09$ mm.
$h = 0.5$ mgm.

and substituting in the formula above $R = 21.7$ mm.

It is important, if the calibration of the instrument is to be substantially unaffected by changes in level, that the dumb-bell be mounted at its centre of inertia; this may be effected readily by the means indicated.

By the term "fibre" as employed in the specification, we intend to indicate a suspension strip of any cross-section made of any material of suitable elasticity. It has been found very suitable to use a quartz fibre or a gold-alloy suspension strip or a platinum-iridium suspension strip.

Very suitably the fibre is carried by a supporting unit or member contained within the cell, wherein one end of the fibre is rigidly fixed to one arm of the member, and the other end of the fibre is rigidly fixed to a torsion head supported on the other arm of said member. The supporting unit or member employed suitably comprises a G-shaped or like body provided with arms between which the fibre carrying the test piece may be suspended, and allowing the free rotation of the test piece about the suspension fibre.

For the satisfactory employment of the instrument it is very desirable that the position taken up by the test piece in the cell should respond rapidly to the composition of the gases passing through the cell, and consequently the cell should be capable of being swept out by gas in a short time, without, however, causing any turbulence in the cell which would result in the mechanical disturbance of the test piece and interfere with the satisfactory use of the apparatus.

It is a further object of the invention to ensure that the passage of gas through the cell can be effected without mechanically disturbing the test piece, and without causing turbulence in the cell. This can suitably be effected by introducing the gases into the cell through a capillary tube directed away from the position of the test piece wherein the capillary tube terminates in the cell in a position as remote from the test piece as is possible, and desirably such that the incoming gases impinge on a surface contained in the cell at right angles to the direction of flow of the gases. Very suitably both the inlet and outlet tubes are arranged in the same way as described above, the inlet and outlet tubes being directed in substantially opposite directions. This form of construction has the advantage that inadvertent confusion between the inlet and outlet tubes will have no deleterious result. In this way "streamline" gas flow can be obtained in the cell, and consequently the cell can be swept out very rapidly without disturbing the test body. The pressure gradient across the cell should not be large, as otherwise turbulence in the cell cannot be avoided, and is preferably in the range 10–3 mm. of water. Desirably, the gas entering the cell should be under substantially atmospheric pressure, and the gas line to the cell provided with a relief valve of suitable design.

In order to describe the invention more clearly, one form of the apparatus according to the present invention is shown, solely by way of illustration, in the accompanying drawings.

Figure 1 shows a plan view of the cell, and Figures 2 and 3 are diagrammatic cross sections along lines AA and BB respectively on Figure 1. Figure 4 is a side elevation showing the detail of the support for the test piece. Figure 4A is a fragmentary front elevation view of an alternative arrangement with a mirror on the test piece.

Figure 5 is a side elevation of an alternative support for the test piece and Figure 6 is an enlarged cross-section along the line CC in Figure 5. Figure 7 shows a side elevation of a fibre and associated spring.

The cell comprises the frame made of a substantially non-magnetic material, such as brass, said frame consisting of a three-sided unit 1, the fourth side 2 being capable of being secured into said unit, the side 2 being provided with a window 3 made of a transparent material such as glass. This frame contains slidably therein the pole pieces 4 and 5, the faces 6 and 7 of which mate with the facing poles of the permanent magnet employed. The pole piece 4 carries therein the supporting body 8, suitably made of brass and the base of which fits slidably into the pole piece. To the arms of the body 8 the suspension fibre, suitably a quartz fibre 9, is fixed, and said fibre has cemented at right angles thereto, in the position which will correspond to the gradient of field strength most appropriate to the application of the apparatus, the test body 10, which in the present instance is a quartz dumbbell. The suspension fibre 9 also carries a mirror 11 and a counterweight 12. Alternatively, as shown in Fig. 4A, the mirror may be cemented to the bar joining the bulbs of the test body 10, and the counterweight 12 may be eliminated.

The cell is provided with a gas inlet and outlet tubes 13 and 14 comprising capillary tubes which are directed away from the test piece, and which terminate near to the faces 15 and 16 of the frame.

In Figure 5 the G-shaped supporting body 21 carries the member 22 and the torsion head 23 between which the fibre 24 is suspended. The member 22 fits slidably into a recess in the lower arm of the supporting body 21, and can be rigidly fixed therein by means of a grub screw 25. The torsion head 23 is of circular cross-section, the lower part of which fits slidably in a circular recess in the upper arm of the supporting body 21. The torsion head can be rotated by inserting a pin into one of the holes 26 in the circular head thereof, and turning the torsion head with respect to the supporting unit 21 to the desired extent. The torsion head can be locked in position by means of the grub screw 27. In this unit both the tension and torsion on the fibre can be readily adjusted, the torsion by means of the torsion head 23, as shown above, and the tension by means of vertical movement of the member 22 in its containing recess.

The fibre 24 is cemented to the torsion head, at point 28, and the lower supporting member 22, as shown in the drawing. When employing a quartz fibre, the torsion head is most suitably constructed of silver, the quartz fibre being fused thereto by means of silver chloride. On the other hand, where a metal strip fibre is employed, the torsion head may be constructed of any substantially non-magnetic metal, most suitably brass or copper, the metal strip being soldered thereto. The supporting body 21 is suitably provided with an internally threaded hole, as shown, into which a supporting member may be screwed, to facilitate its placing in and removal from the cell.

In order to give the fibre greater resilience and to make it more capable to withstand mechanical shocks, the lower end of the fibre 24 may be cemented to a spring e. g. a quartz rod, which may be bent to form a right-angled spring, which is itself cemented to the member 22, or the fibre may be cemented to a U spring as shown in Figure 7.

Very suitably the dimensions of the parts of the cell are as follows: the external dimensions of the cell are 1.0625 inches by 1.26 inches; the overall dimensions of the pole pieces 4 and 5 are 0.8125 inch by 0.34375 inch by 0.75 inch and 0.8125 inch by 0.34375 inch by 0.375 inch respectively; the inlet and outlet tubes 13 and 14 comprise 0.037 inch internal diameter tubes which terminate 0.03125 inch distance from the faces 15 and 16 of the frame. With this cell it has been found that the sweep out time is in the range 5 to 10 seconds when the difference in pressure between the inlet and outlet gases is $10^{-3}$ millimeters of water respectively.

The various elements of the cell must be precision tooled to ensure the exact fit of each part so that when the cell is in position between the facing poles of the permanent magnet employed, the cell is substantially gastight. As the pole pieces are contained slidably in the frame, the faces 5 and 6 of the pole pieces can mate with the faces of the poles of the permanent magnet, and thus small errors in the workmanship which might lead to a break in the magnetic flux can be overcome. If desired the cell may be coated with shellac or like material to ensure that it is gas tight.

Suitably, the instrument may be arranged so that the suspension fibre lies along a substantially vertical axis. It is important that the instrument be calibrated with the suspension fibre lying in the same axis as when the instrument is in use.

In the operation of the apparatus, which can suitably be applied to the measurement of the oxygen content of gases, the cell is positioned between the poles of the permanent magnet, and the gas under test is passed therethrough. The deflections of the test body are suitably measured by means of a light spot, reflected by the mirror carried by the suspension fibre, the deflections of which may be measured directly on a scale or are more suitably recorded by means of photoelectric cells and associated electrical recording means. One such system is described for example in my copending application Serial No. 201,552, filed December 19, 1950. In systems employing light spots where photoelectric cells are used as measuring elements it is desirable that the effects of light variations be eliminated. This may suitably be effected by using a null balance method. According to one such method the output from the photoelectric cell may be amplified and used to operate a servo-mechanism that brings the photoelectric cell to a position such that both sides of the photoelectric cell are equally illuminated, or in other words such that the photoelectric cell or cells are in equilibrium or balanced position. The displacement of the photoelectric cell (measured by suitable electrical or mechanical means) serves as a measure of the angular displacement of the test piece. The use of this method would render the readings obtained independent of fluctuations in the light source, caused for example by means fluctuation. According to another method the output from the photocell suitably amplified and operating a servo-mechanism may be used to turn a torsion head, as shown in Figure 5, to maintain the dumb-bell in the same position so that both halves of the photoelectric cell are equally illuminated. The rotation of the torsion head may be accomplished by means of a suitable worm gear and pinion attached to the torsion head.

The present invention includes, inter alia, the testing of gases using the apparatus hereinbefore defined, and also chemical processes which are characterised by the use of said apparatus for the testing of the reaction and other gases in the control of such processes.

The apparatus of the present invention may be employed for the analysis of any gas mixture which is susceptible to analysis by virtue of its magnetic properties. Thus for instance the apparatus may be used for the determination of paramagnetic gases oxygen, nitrogen peroxide, nitric oxide chlorine dioxide. The apparatus finds most general use in the estimation of oxygen in gas mixtures in concentrations ranging between 0% and 100%. Naturally in such estimations, for example of the oxygen content of a gas, it is necessary that other paramagnetic gases such as nitric oxide and the like are not present, or if present, that their effect on the estimation is allowed for.

The thickness of the fibre supporting the test piece is of considerable importance so far as the robustness of the apparatus is concerned. Where a quartz fibre is employed it should be of a thickness in the range 15–20 mu diameter, and where a metal suspension strip, for example a gold strip, is used it should be of approximately the following dimensions: 0.003 inch width by 0.0003 inch thickness.

The deflection of the test piece necessary for the instrument to be adequately sensitive is not large, and for instance when employing a twin photoelectric cell for recording the deflections of the test piece, as is described in my copending application Serial No. 201,552, filed December 19, 1950, the size of the fibre employed, within the ranges indicated above, should be such that when the gas concentration changes from zero oxygen concentration to maximum oxygen concentration, the light spot does not leave the area of the cathodes of the twin photoelectric cell. In this way maximum robustness for a given sensitivity is obtained.

The length of the fibre ought to be such that the time of oscillation can be overcome by suitable electrical means, such as by the use of condensers. It is preferred that the fibre is about 10 mm. in length.

The magnet referred to in the specification and claims may be either a permanent magnet or an electromagnet. It is preferred, however, to use a permanent magnet. The field strength of the magnet should be as high as possible to give maximum sensitivity to the apparatus.

I claim:

1. In an apparatus for measuring the magnetic susceptibility of gases which comprises a magnet, a cell adapted to be inserted as a unit between the facing poles of said magnet and providing a chamber therebetween, said cell being made of a substantially non-magnetic material, and having a frame and two magnetic pole pieces shaped to produce a non-uniform magnetic field fitting in the ends thereof, a test piece suspended in said chamber and mounted between the two pole pieces on a fibre rigidly supported at both ends within the chamber, means for the passage of gas through the chamber, said chamber being otherwise substantially gastight when in position between the poles of the magnet and means for the measurement of the angular deflection of the test piece, in accordance with the magnetic susceptibility of the gas in said chamber.

2. An apparatus as in claim 1 wherein said cell is slidable between the facing poles of said magnet with said pole pieces adjacent the poles of said magnet.

3. An apparatus as in claim 1 wherein the test piece is made of a material selected from the group consisting of materials of substantially zero magnetic susceptibility and materials of slight diamagnetic volume susceptibility.

4. An apparatus as in claim 1 wherein the test piece comprises a dumb-bell consisting of two equal spheres rigidly connected by a bar.

5. An apparatus as in claim 1 wherein the means for the passage of gas through the chamber comprise two capillary tubes, whose mouths are each directed away from the test piece and are adjacent surfaces within said chamber.

6. An apparatus for measuring the magnetic susceptibility of gases which comprises a magnet and a cell constrained to slide as a unit between the facing poles of said magnet, said cell comprising a frame made of a substantially non-magnetic material, and containing slidably therein two pole pieces shaped to produce a non-uniform magnetic field, a test piece suspended between the two pole pieces on a fibre rigidly supported within the cell, means for the passage of gas through the cell, said cell being substantially gastight when in position between the poles of the magnet, and means for the measurement of the angular deflection of the test piece.

7. An apparatus for measuring the magnetic susceptibility of gases which comprises a magnet and a cell providing a chamber and slidable as a unit between the facing poles of said magnet made of a substantially non-magnetic material, having a frame and two magnetic pole pieces shaped to produce a non-uniform magnetic field tightly fitting in the ends thereof, a test-piece suspended in said chamber between the two pole pieces and in said non-uniform magnetic field on a fibre rigidly supported between two arms of a member contained within the cell, one end of the fibre being rigidly fixed to one arm of said member and the other end of the fibre rigidly fixed to a movable torsion head supported on the other arm of said member, means for the passage of gas through the chamber, said chamber being otherwise substantially gastight when in position between the poles of the magnet, and means for the measurement of the angular deflection of the test piece, in accordance with the magnetic susceptibility of the gas in said chamber from time to time.

8. An apparatus for measuring the magnetic susceptibility of gases which comprises a magnet and a cell constrained to slide between the facing poles of said magnet, said cell comprising a frame made of a substantially non-magnetic material, and containing therein two pole pieces shaped to produce a non-uniform magnetic field, a test piece suspended between the two pole pieces on a fibre rigidly supported within the cell, said test piece comprising a dumb-bell consisting of two substantially identical spheres connected by a bar, said bar being cemented to the fibre, in such a position and being so curved that the centre of inertia of the test piece coincides with the axis of the supporting fibre.

9. An apparatus for measuring the magnetic susceptibility of gases which comprises a magnet and a cell constrained to slide as a unit between the facing poles of said magnet, said cell comprising a brass frame and containing therein two mild steel pole pieces shaped to produce a non-uniform magnetic field, a test piece consisting of two substantially identical quartz spheres connected by a bar suspended substantially at its centre of inertia on a quartz fibre rigidly supported at both ends within the cell, means for the passage of gas through the cell, said cell being substantially gastight when in position between the poles of the magnet, and means for the measurement of the angular deflection of the test piece.

10. A cell, adapted to be positioned between the facing poles of a magnet, comprising a frame made of a substantially non-magnetic material containing therein, fitting into the ends of said frame two pole pieces shaped to produce a non-uniform magnetic field, within said cell, a test piece suspended in said cell between the two pole pieces on a fibre rigidly supported at both ends within the cell and means for the passage of gas therethrough, the cell being otherwise substantially gastight.

11. A cell, as in claim 10 wherein the pole pieces are contained slidably within the frame of said cell.

CHARLES WALTER MUNDAY.

References Cited in the file of this patent

UNITED STATES PATENTS

| Number | Name | Date |
|---|---|---|
| 2,416,344 | Pauling | Feb. 25, 1947 |
| 2,476,304 | Kells et al. | July 19, 1949 |